United States Patent [19]

Hemman

[11] Patent Number: 4,731,177
[45] Date of Patent: Mar. 15, 1988

[54] MULTI-STAGE STRAINING APPARATUS

[76] Inventor: Edward B. Hemman, 2107 9th St., Sanger, Calif. 93657

[21] Appl. No.: 947,867

[22] Filed: Dec. 30, 1986

[51] Int. Cl.⁴ .............................................. B01D 23/02
[52] U.S. Cl. ...................................... 210/86; 210/94; 210/241; 210/338
[58] Field of Search ...................... 210/241, 256, 257.1, 210/259, 261, 262, 335, 337–339, 474, 476, 499, 238, 94, 95, 86

[56] References Cited

U.S. PATENT DOCUMENTS

| | | | |
|---|---|---|---|
| 347,581 | 8/1886 | Dodge | 210/337 |
| 433,659 | 8/1890 | Schermerhorn | 210/315 |
| 557,399 | 3/1896 | Knight | 210/103 |
| 602,488 | 4/1898 | Tice et al. | 210/476 |
| 942,121 | 12/1909 | White | 210/337 |
| 1,044,074 | 11/1912 | Nugent | 210/338 |
| 1,208,882 | 12/1916 | Young | 210/476 |
| 1,536,890 | 5/1925 | Lagemann | 210/476 |
| 1,556,993 | 10/1925 | Hulscher | 210/337 |
| 1,831,290 | 11/1931 | Daniel | 210/464 |
| 1,989,034 | 1/1935 | Anderson et al. | 210/238 |
| 2,312,091 | 2/1943 | Gray | 210/338 |
| 3,040,897 | 6/1962 | Holman | 210/464 |
| 3,348,689 | 10/1967 | Kraissl, Jr. | 210/238 |
| 3,940,065 | 2/1976 | Ware et al. | 239/146 |

Primary Examiner—Ivars Cintins
Attorney, Agent, or Firm—Worrel & Worrel

[57] ABSTRACT

An apparatus for removing debris and other foreign matter from a solution of paint and the like, the apparatus having a vacuous vessel for receiving the paint solution which has been strained; a straining assembly which has a main body mounted in fluid-flow communication with the vacuous vessel; and a plurality of removable filter elements are positioned internally of the main body and which are adapted, selectively, to remove any debris or other foregin matter from the solution of paint which is passed therethrough.

5 Claims, 4 Drawing Figures

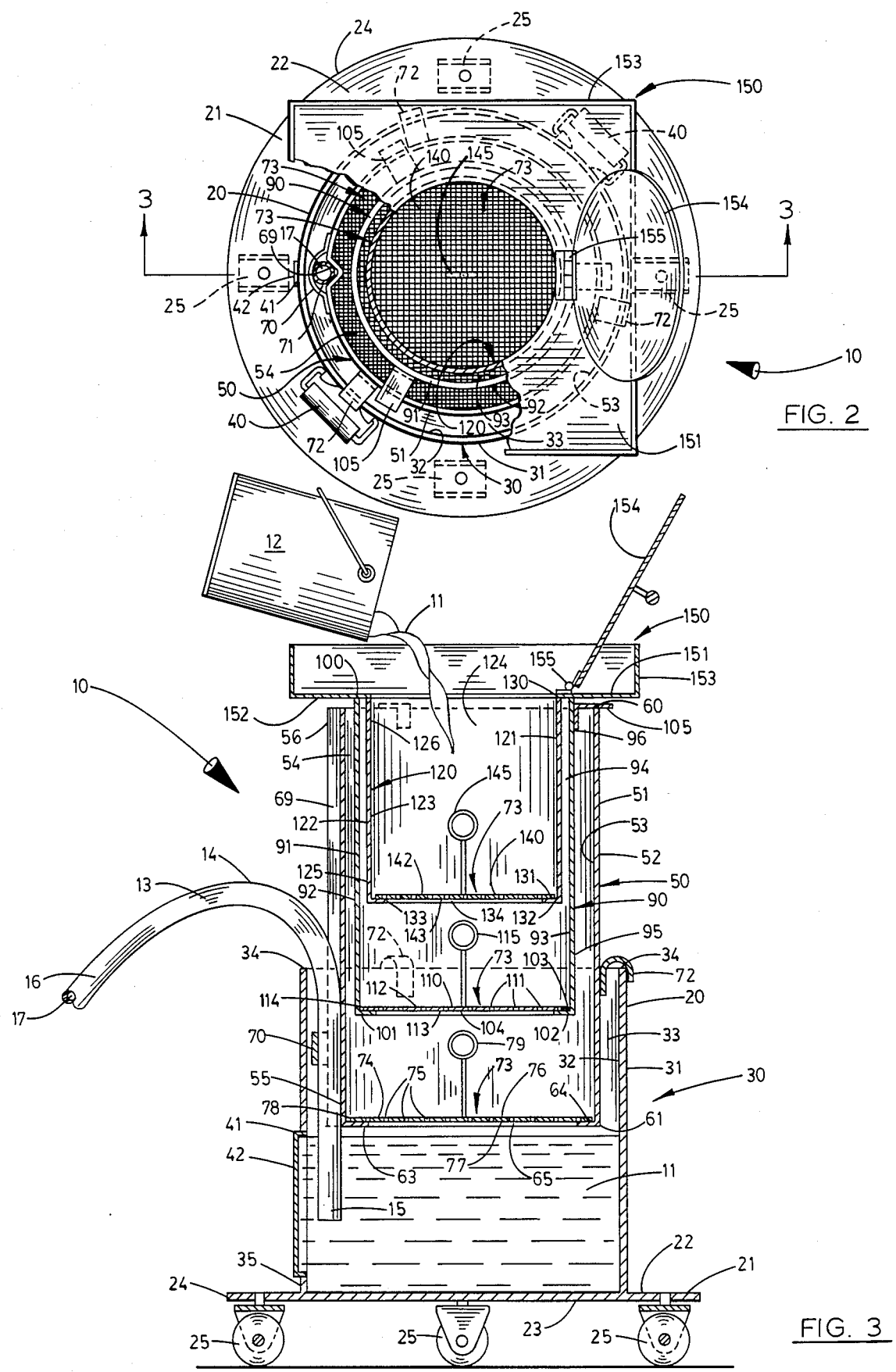

MULTI-STAGE STRAINING APPARATUS

BACKGROUND OF THE INVENTION

1. Field of the Invention

The present invention relates to a multi-stage straining apparatus, and more particularly to such an apparatus which is uniquely well suited to remove debris and other particulate matter from a solution of paint or the like by employing a plurality of filtering elements which are advantageously positioned to capture the foreign matter and/or debris, and which further has particular utility for producing a homogeneous paint solution or the like which can be effectively utilized by variously configured spraying apparatus.

2. Description of the Prior Art

There are a variety of solutions which must, from time to time, be dispensed from a batched source of that solution and wherein the solution that is removed from the batch may vary substantially from one instance to the next. For example, paint is routinely dispensed from variously dimensioned containers which range in volume from one gallon to as large as fifty gallons depending in large measure upon the size of the painting project being undertaken. As should be understood, the application of paint, in a commercial setting, is a very highly labor intensive operation, and therefore quite expensive whether such painting is performed by utilizing conventional brushes or rollers, or by employing variously configured spraying apparatus. As the expense of employing manual labor has increased over the years due in part to the minimum wage laws and other legislation, assorted manufacturers have carried out research, directed towards developing an improved lightweight spraying apparatus which permits a painter to dispense ever increasing amounts of paint over larger surface areas per hour. This development activity has reaped numerous results in the art fields of electric and pneumatically actuated spray guns. Although the prior art is replete with numerous examples of spraying apparatuses designed for dispensing paint with greater efficiency, these spraying apparatuses have suffered from common problems which have limited their usefulness. A lack of dependability as the result of jamming of the operative mechanism has been the primary impediment. This jamming or clogging of the spraying apparatus has been due, in large measure, to the presence of foreign matter and other debris in the paint solutions.

Attempts made in the prior art to address the problems associated with the jamming or clogging of the operational mechanism of a spraying apparatus have assumed various forms. For instance, many painters employing a spraying device will, as a matter of course, thin their paint using commercially available solvents to prevent the paint from clogging or otherwise jamming the operational components. In other instances, the painter may utilize a flexible filter bag through which the paint is first passed for the purpose of removing any debris or foreign matter which may be present in the paint.

Other attempts in the prior art to provide a means for removing debris and foreign matter from a solution of paint have included a wide range of filter assemblies which are attached to the end of a spray line, the spray line being adapted to withdraw paint from a batched source, and to supply it to the spraying apparatus. These assemblies have operated with some degree of success. However, they have significant limitations inasmuch as they routinely become coated with the debris and other foreign matter which is present in the paint solution and therefore require periodic cleaning and inspection.

While some of the prior art practices and devices have operated with varying degrees of success, they are unsatisfactory in one or more aspects. For example, some of these devices and practices are cumbersome; do not routinely produce a homogeneous paint solution free from debris and other foreign matter; and are often not convenient to employ. Others take exceedingly great amounts of time to use; or are otherwise useful on one occasion only. Yet another deficiency common among the prior art devices is that they generally require constant attention or periodic monitoring to determine if they are operating effectively.

Therefore, it has long been known that it would be desirable to have a multi-stage straining apparatus for paint and the like which is capable of removing debris and other foreign matter from a solution of paint for the purpose of producing a homogeneous solution which can be used by a spraying apparatus, the apparatus of the subject invention being easy to clean and maintain; is inexpensive to manufacture and sell; and which is characterized by ease of utilization.

OBJECTS AND SUMMARY OF THE INVENTION

Therefore, it is an object of the present invention to provide an improved multi-stage straining apparatus for removing debris and foreign matter from a solution of paint and the like.

Another object is to provide a multi-stage straining apparatus which is so constructed that substantially all of the debris and other foreign matter suspended in a paint solution is effectively removed therefrom.

Another object is to provide such a multi-stage straining apparatus which is mounted in a telescoping attitude internally of the vacuous vessel which receives the paint solution that has been strained.

Another object is to provide such a multi-stage straining apparatus which is characterized by ease of employment, simplicity of construction, and which can be sold at a relatively nominal price.

Another object is to provide such a multi-stage straining apparatus which, when mounted in fluid-flow communication with a vacuous vessel for receiving the strained paint, is adapted to eliminate substantially all contamination or other debris which might otherwise have contaminated the strained paint solution from the external environment.

Another object is to provide such a multi-stage straining apparatus which is adapted to produce a homogeneous paint solution from a batched source of contaminated paint and which is particularly well suited to permit the dispensing of the strained paint to an appropriate spraying apparatus.

Another object is to provide such an apparatus wherein a plurality of filter elements are readily removable from the apparatus for the purpose of cleaning, replacement, or maintenance.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 2 is a somewhat enlarged top plan view of the apparatus of FIG. 1 shown in a typical operative configuration with a supporting surface removed to show the underlying structure.

FIG. 3 is a somewhat reduced, fragmentary, vertical, longitudinal section taken on line 3—3 of FIG. 2.

DESCRIPTION OF THE PREFERRED EMBODIMENT

Figure 1:
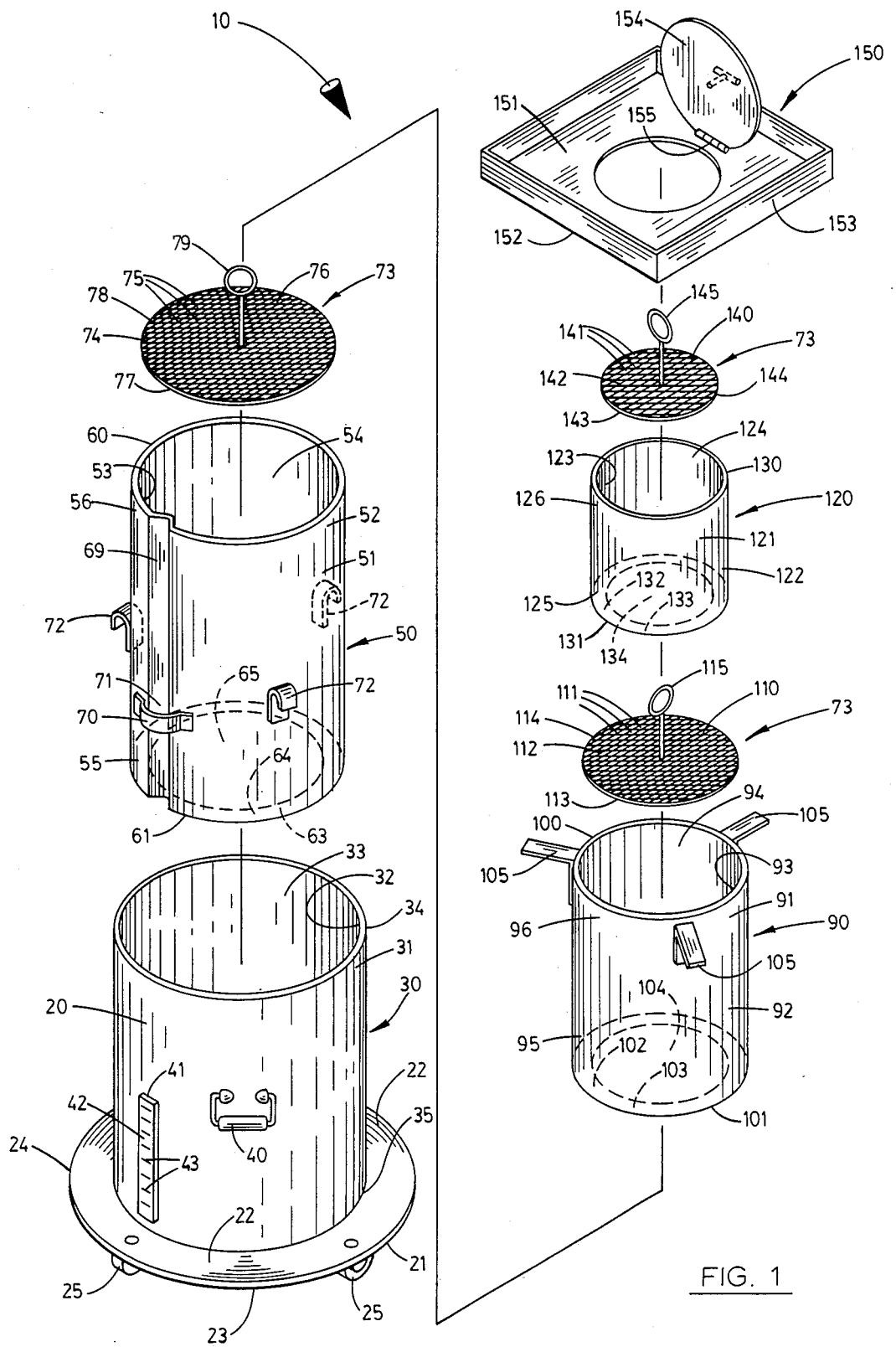
FIG. 1 is a perspective view of the first form of the multi-stage straining apparatus and the like of the present invention shown in an exploded configuration for illustrative convenience.

Referring more particularly to the drawings, the multistage straining apparatus of the present invention is generally designated by the numeral 10.

As will hereinafter become more clearly apparent, the apparatus 10 is adapted to remove debris and other foreign matter from a batched solution. For purposes of illustrative convenience, the apparatus is described as it would be configured if it were employed to remove debris and foreign matter from a solution of paint which is to be supplied to a spraying apparatus, not shown. While the apparatus is described herein for straining a batched solution of paint, it will be understood that the apparatus can be employed to strain a variety of different types of solutions, and therefore the invention hereof is not to be limited to straining paint.

For illustrating the various aspects of the apparatus 10 it should be appreciated that the apparatus receives a batched solution of paint 11 from a container of paint 12, which is herein illustrated as a gallon can. In order more clearly to understand the operation of the apparatus it should be understood that the solution of paint is of the type typically applied to the interior surfaces of homes and the like. Those skilled in the art will readily appreciate that a solution of paint which has been stored for a prolonged period of time will typically separate into its component elements and these components will thereafter precipitate out of solution. As should be appreciated, this non-homogeneous solution of paint cannot be utilized in this state. To rectify this situation, the solution of paint is stirred or otherwise agitated to suspend the component elements to create a substantially homogeneous solution. Moreover, it should be understood that when the solution of paint is exposed to the air, it will, within a relatively short period of time, begin to congeal or otherwise coagulate to form irregularly shaped semi-solid bodies which can, and typically do, obstruct or otherwise restrict the operation of the spraying apparatus, not shown. The spraying apparatus is supplied with paint through a suitably dimensioned flexible spray line 13. The spray line is of conventional configuration having an outside surface 14, a first end 15, and an opposed second end 16, which is connected in communication with the spraying apparatus. The spray line 13 defines a fluid transferring passage 17 which allows the solution of paint to travel to a spraying apparatus.

As best seen by reference to FIG. 3, the apparatus 10 is mounted in fluid transferring relation on a vacuous storage vessel 20 which receives the paint solution 11 which has been strained. The vacuous vessel 20 has a substantially circular base 21, which has a top surface 22, an opposed bottom surface 23, and a peripheral edge 24. Suitably affixed in predetermined locations about the bottom surface 23 and in close proximity to the peripheral edge 24 is a plurality of rotatable casters or wheels 25.

Mounted substantially centrally, and extending in a nearly normal attitude with respect to the top surface 22 of the base 21, is a continuous wall or cylindrical main body generally indicated by the numeral 30. As best understood by reference to FIG. 1, the cylindrical main body 30 has a diameter dimension which is somewhat less than that of the base upon which it is mounted. This feature gives the vacuous vessel 20 greater stability. The continuous wall 30 has an outside surface 31, an opposed inside surface 32, which defines a space 33 which receives the solution of paint which has been strained, a top edge 34 and an opposed bottom edge 35, which is sealably secured to the top surface of the base. Mounted in a predetermined position to the outside surface 31 is a pair of handles 40. The handles are of conventional configuration, which permit the vacuous vessel to be easily moved from place to place. Formed in a predetermined attitude into the continuous wall 30 is a graduated measuring port which is generally indicated by the numeral 41. The graduated measuring port mounts a suitably dimensioned window 42 that has inscribed on it's surface a scale 43 which indicates the volume of strained paint which is held by the vacuous vessel 20.

A first strainer assembly, generally indicated by the numeral 50, is slidably telescoped or otherwise mounted in internal mating receipt, and fluid-flow relation with the vacuous vessel 20 about the top edge 34. The first strainer 50 has a substantially cylindrical main body 51 which has an external surface 52, an internal surface 53, which defines a chamber or passage 54, a first end 55 and an opposed second end 56. The first strainer further has a top edge 60, and a bottom edge 61, which is disposed internally of the space 33. Formed about the first end 55 and disposed in a substantially normal attitude to the internal surface 53 of the cylindrical main body 51 is a flange 63. The flange has a supporting surface 64, and further defines an orifice 65 of reduced dimension which permits the solution of paint 11 to pass therethrough.

Formed into the external surface 52 of the cylindrical main body 51 of the first strainer 50 is a recess 69. Mounted in overlying relationship to the recess and affixed to the external surface 52 is a hose retainer 70. The recess, and hose retainer which are best illustrated by reference to FIG. 1, define a passageway 71. It should be understood that the passageway defined by the recess 69 and the hose retainer 70 is adapted to receive and capture the spray line 13 that withdraws the solution of paint 11 which has been strained and received by the vacuous vessel 20. As best seen by reference to FIG. 3, a plurality of mounting assemblies, or hooks 72 are affixed in a suitable attitude about the external surface 52 for the purpose of engaging the top edge 34 of the vacuous vessel to hold the first strainer in its predetermined telescoping attitude.

A plurality of removable filter elements, or straining screens which are generally indicated by the numeral 73 and which will hereinafter be discussed in greater detail, are disposed in fixed spaced relationship in the chamber 54 to remove any debris and foreign matter present in the solution of paint 11. The first removable filter element 74 is appropriately dimensioned for rested mating receipt on the supporting surface 64 of the flange 63 that is mounted about the bottom edge 61 of the first strainer assembly 50. The first filter element 74, which is formed out of a suitably dimensioned rigid mesh screen or other similar material has a plurality of pores 75 having a small dimension, and a top surface 76, which is adapted to capture the debris and foreign matter which may be present in the solution of paint. The first filter element 74 has a bottom surface 77 which rests in facing engagement with the flange 63. The first filter element further has a peripheral edge 78. As should be understood the first filter element is dimensioned to be slidably received in the chamber 54. Mounted substantially centrally of the first filter element 74 is a handle 79 which permits the first filter element to be easily removed from the chamber 54. The plurality of filter elements 73 have individually variable pore sizes and are mounted serially in the chamber 54 in the order of ever decreasing pore size. It should be appreciated therefore that the first filter element 74 has the smallest pore size, and is therefore adapted to remove and capture the smallest debris and foreign matter which may be suspended in the solution of paint 11.

As best illustrated by reference to FIGS. 1 and 3, a second strainer assembly, generally indicated by the numeral 90, is mounted in a predetermined telescoping attitude internally of the first strainer assembly 50. The second strainer 90 has a substantially cylindrical main body 91 that has an outside surface 92, which is positioned in substantially parallel spaced relation to the internal surface 53 of the substantially cylindrical main body 51 of the first strainer assembly 50 when the second strainer is mounted in fluid receiving engagement with the first strainer assembly. The substantially cylindrical main body 91 has an inside surface 93, which defines a chamber or passage 94, of predetermined dimensions. As should be understood, the chamber 94 has a somewhat smaller diameter dimension as compared with the dimensions of the chamber 54 which is defined by the internal surface 53 of the cylindrical main body 51 of the first strainer assembly. The second strainer assembly further has a first end 95, a second end 96, a top edge 100, and an opposed bottom edge 101. Formed about the first end 95, and disposed in a substantially normal attitude with respect to the inside surface 93 is a flange 102. The flange 102 has a supporting surface 103 and further defines a second orifice 104 having a constricted dimension. It should be understood in this instance that the second orifice 104 has a somewhat smaller diameter as compared with the diameter of the first orifice 65 which is defined by the flange 63 which is mounted at the first end 55 of the first strainer assembly 50. Affixed by a suitable fastener, not shown, to the top edge 100 of the second strainer assembly are a plurality of stabilizing bars or handles 105 which position the second strainer assembly in its predetermined telescoping attitude internally of the first strainer assembly.

Slidably received and mounted in fixed spaced relationship internally of the channel 94 at the first end 95 of the second strainer assembly 90 is a second removable filter element generally designated by the numeral 110. The second filter element which is formed out of an appropriately dimensioned rigid mesh screen or other similar material has a plurality of pores 111 which permits the solution of paint 11 to pass therethrough but which captures debris and other foreign matter which may be suspended in the solution of paint. The second filter element has a top surface 112, an opposed bottom surface 113, which rests in facing engagement with the supporting surface 103 of the flange 102, and a peripheral edge 114. Mounted substantially centrally of the second removable filter element is a handle 115 which permits a user of the apparatus 10 to easily remove the second filter element 110 from the chamber 94. It should be understood that the plurality of pores 111 have a diameter dimension which is somewhat slightly larger as compared with the pore diameter of the first filter element 74. The overall surface area of the second filter element is also somewhat smaller as compared with the first filter element as a consequence of the somewhat smaller cross-sectional dimensions of the second strainer 90.

A third strainer assembly 120 is deployed in slidably mounted receipt and in a predetermined telescoping attitude internally of the second strainer assembly 90. This relationship is most clearly illustrated by reference to FIG. 3. The third strainer 120 has a substantially cylindrical main body 121 which has an external surface 122 that is positioned in substantially parallel fixed spaced relationship from the inside surface 93 of the second strainer 90 when the third strainer is mounted in fluid receiving relationship internally of the second strainer. The third strainer has an internal surface 123 which defines a passage or chamber 124 which has a volumetric dimension which can accommodate the solution of paint 11 contained in the gallon can 12. The third strainer has a first end 125, a second end 126, a top edge 130 and an opposed bottom edge 131. Formed about the first end 125, and disposed in a substantially normal attitude with respect to the internal surface 123 is a flange 132. The flange has a supporting surface 133, and defines a third orifice 134 which has a constricted dimension. As should be understood, the third orifice has a diameter dimension which is somewhat smaller as compared with the diameter of the second orifice 104 and the first orifice 65.

Slidably received and mounted in rested mating engagement with the supporting surface 133, of the concentric flange 132 is a third removable filter element, generally designated by the numeral 140. The third filter element 140 is formed of an appropriately dimensioned rigid mesh screen or other similar material and has a plurality of pores 141, a top surface 142, a bottom surface 143 and a peripheral edge 144. Mounted substantially centrally of the third filter element is a handle 145 which permits a user of the apparatus 10 easily to remove the third filter element from the chamber 124. As should be appreciated, the pores of the third filter element have a somewhat larger diameter dimension as compared with the pore diameter of the first filter element and the second filter element 110. The third filter element therefore removes the largest debris or other foreign matter which may be suspended in the solution of paint 11.

Mounted in sealably secure relationship about the second end 126 of the third strainer 120 is a funnel assembly generally indicated by the numeral 150. The funnel assembly has a top or fluid engaging surface 151 and an opposed bottom surface 152. Mounted about the peripheral edge of the fluid engagement surface 151 is a continuous substantially vertical wall 153. As should be understood, the funnel assembly is adapted to channel any paint which may be accidentally spilled into the third strainer. Pivotally affixed to the fluid engagement surface 151 is a closure member 154 which is dimensioned for covering receipt over the chamber 124. The closure member is attached to the fluid engagement surface by a hinge 155.

Figure 4:
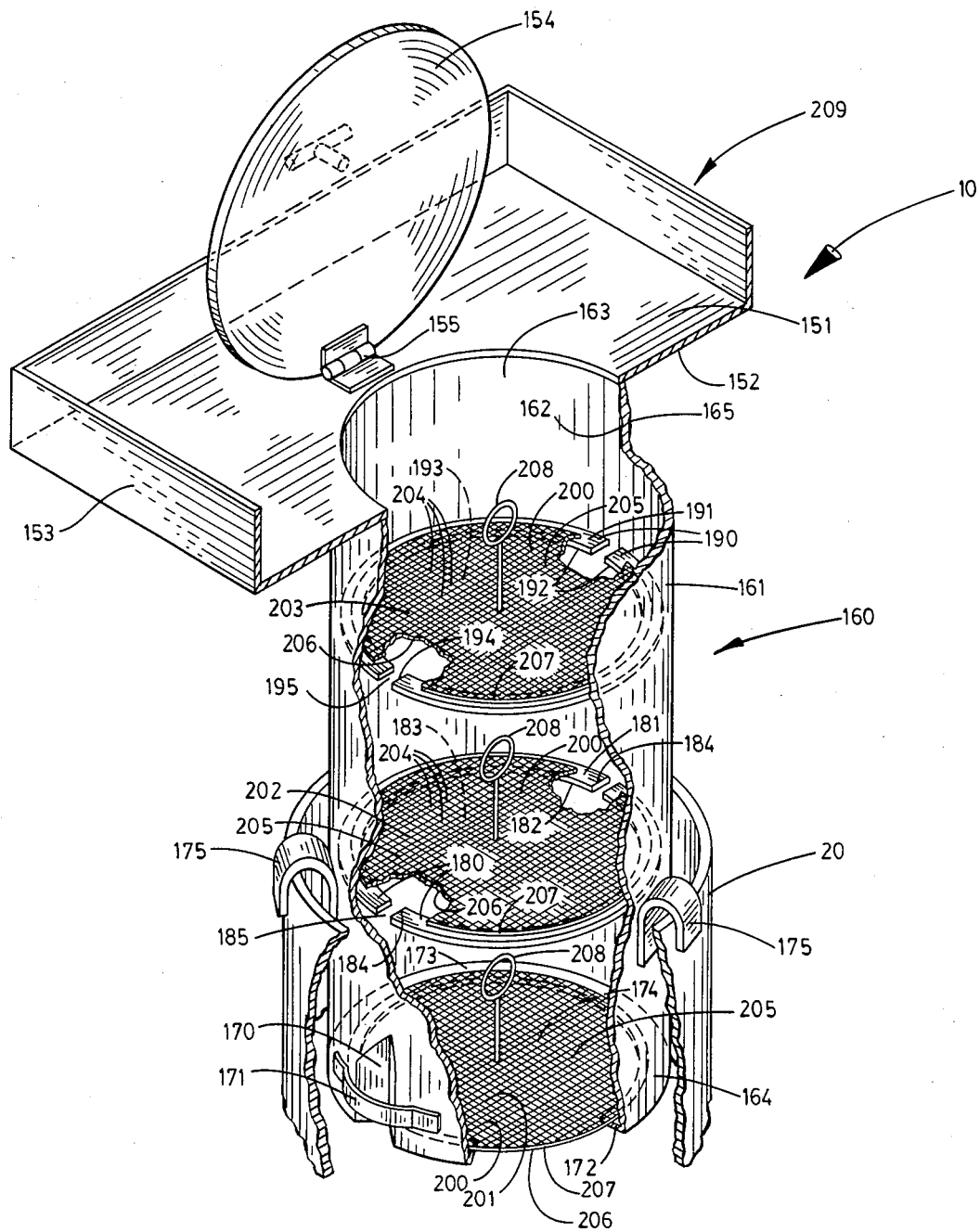
FIG. 4 is a perspective view of the second form of the multi-stage straining apparatus and the like of the present invention shown in a typical operative configuration, with the underlying structure shown in hidden lines.

As best seen by reference to FIG. 4, a second form of the apparatus 10 has a unitary substantially cylindrical main body 160 which has an exterior surface 161 and an opposed interior surface 162 which defines a passage or chamber 163. The main body 160 has a first end 164 and a second end 165. Formed in the exterior surface, in an appropriate attitude closely adjacent to the first end 164 is a recess 170. A hose restrainer 171 which is mounted on the exterior surface in covering relation to the recess 170 is dimensioned to receive the spray line 13 which withdraws the solution of paint 11 from the vacuous vessel 20. The recess 170 and the hose restrainer 171 operate in a manner identical to the recess 69 and the hose restrainer 70, that is, capturing the spray line thus holding it internally of the vacuous vessel 20 and in fluid-flow communication with the solution of paint 11. Formed about the first end 164, in an attitude which is substantially normal to the interior surface 162 is a continuous flange 172. The continuous flange has a supporting surface 173 which defines an orifice of reduced dimension 174. Mounted on the exterior surface 161 is a plurality of mounting assemblies or hooks 175 which are adapted to engage the top edge 34 of the vacuous vessel thus holding the substantially cylindrical main body 160 in a telescoping attitude internally of the vacuous vessel.

Mounted internally of the chamber 163, and in fixed spaced relationship with respect to the continuous flange 172 is a first discontinuous flange 180. The first discontinuous flange has a supporting surface 181, an inside edge 182, which defines an orifice 183, and a plurality of transversely disposed edges 184. The edges 184 define a channel 185. A second discontinuous flange 190 is mounted internally of the chamber 163 in fixed spaced relationship with respect to both the second end 165 and the first discontinuous flange 180. The second discontinuous flange has a supporting surface 191, an inside edge 192, which defines an orifice 193, and a plurality of transversely disposed edges 194. The transversely disposed edges 194 define a channel or passage 195 which is in substantial alignment or registry with the channel 185 defined by the plurality of transversely disposed edges 184 of the first discontinuous flange 180.

A plurality of removable filter elements which are generally indicated by the numeral 200 are dimensioned for rested mating engagement with the first and second discontinuous flanges 180 and 190, respectively, and the continuous flange 171. The first, second and third filter elements, which are designated numerically 201, 202 and 203, respectively, have a multiplicity of pores 204. It should be understood that pore dimensions of the individual filter elements are variable. The first, second, and third filter elements are mounted serially in the chamber 163 in the order of ever decreasing pore size. Therefore, it should be appreciated that the third filter element 203 has the largest pore dimension and the first filter element 201 has the smallest pore size. Each of the filter elements has a top surface 205, a bottom surface 206 and a peripheral edge 207. Disposed substantially centrally of each of the individual filter elements is a handle generally designated by the numeral 208 which permits an operator easily to remove the individual filter elements for cleaning or replacement. Mounted in sealably secure mating relationship about the second end 165 is a funnel assembly 209 which operates in a fashion which is substantially similar to the funnel assembly 150 which was discussed earlier. It should be understood that the first filter element 201 is moved to a position in rested mating engagement with the continuous flange 172 by turning it to a vertical position, and thereafter moving it through the channel 195 and channel 185. In similar fashion, the first removable filter element can be placed in rested mating engagement with the supporting surface 172.

OPERATION

The operation of the described embodiment of the subject invention is believed to be readily apparent and is briefly summarized at this point.

The apparatus 10 which is adapted to remove debris and foreign matter from a solution of paint 11 is mounted in fluid-flow communication about the top edge 34 of the vacuous vessel 20. The apparatus has a substantially cylindrical main body 51 or 160 which is received in a telescoping attitude internally of the vacuous vessel 20, and which mounts a plurality of removable filter elements 73 or 200 that remove any debris and foreign matter which may be suspended in the solution of paint when it is passed through the apparatus. The plurality of filter elements 73 or 200 have a variable pore dimension, that is, the individual filter elements are mounted serially in the order of ever decreasing pore size to capture debris and foreign matter of ever decreasing dimensions. To employ the apparatus 10 an operator simply places the plurality of filter elements in their respective positions and thereafter pours the solution of paint 11 to be strained into the apparatus. The solution of paint moves by the force of gravity, through the plurality of filter elements and is collected in the vacuous vessel 20. The paint is thereafter dispensed from the vacuous vessel.

Therefore, it will be seen that the apparatus 10 for removing debris and foreign matter from a solution of paint and the like of the present invention operates to provide a fully dependable and practical means for producing a homogeneous solution of paint rapidly and conveniently, while reducing to an absolute minimum the possibility of clogging or otherwise obstructing a spray line or a spraying apparatus, not shown, and which is both of sturdy and dependable construction and is inexpensive to manufacture and maintain.

Although the invention has been herein shown and described in what is conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. A multi-stage straining apparatus for removing debris and foreign matter suspended in a solution of paint and the like comprising:
   a vacuous vessel for receiving the paint which has been strained, said vacuous vessel having a top edge which mounts the multi-stage strainer;
   a first strainer assembly slidably mounted in internal mating receipt and into fluid-flow communication with the vacuous storage vessel, said first strainer having a substantially cylindrical main body which has a first end which mounts a first removable filter element and a second end, the cylindrical main body further mounting a plurality of mounting assemblies which engage the top edge of the vacuous storage vessel;

a second strainer assembly slidably received in a predetermined telescoping attitude internally of the first strainer, said second strainer having a substantially cylindrical main body which has a first end which mounts a second removable filter element, and a second end which mounts a plurality of stabilizing bars which rest in facing mating engagement with the second end of the first strainer assembly; and a third strainer assembly slidably mounted in telescoping receipt internally of the second strainer assembly, said third strainer assembly having a substantially cylindrical main body which has a first end that mounts a third removable filtering element, and a second end which mounts a pivotally mounted closure member, the multi-stage strainer apparatus adapted to receive the solution of paint into the third strainer assembly; the paint thereafter travelling through the first, second and third removable filter elements and into the vacuous storage vessel, the individual filter elements removing the foreign matter and debris suspended in the solution of paint to produce a homogeneous paint solution.

2. The apparatus of claim 1 wherein the first, second, and third removable filter elements have a variable pore dimension, said individual filter elements being serially disposed in the order of ever decreasing pore size.

3. The apparatus of claim 1 wherein the first, second and third strainer assemblies each has an internal surface, said internal surface mounting about the first end of each strainer assembly a flange which receives the individual removable filter elements in rested mating engagement.

4. The apparatus of claim 1 wherein the first strainer assembly has formed therein a recess which receives a spray line which is adapted to withdraw paint from the vacuous vessel, said recess capturing the spray line internally of the vacuous vessel.

5. The apparatus of claim 1 wherein the vacuous vessel has a base which mounts a multiplicity of rotatable wheels, and a substantially cylindrical main body, said main body mounting a graduated measuring port that is adapted to indicate the volume of paint held by the vacuous storage vessel.

* * * * *